UNITED STATES PATENT OFFICE.

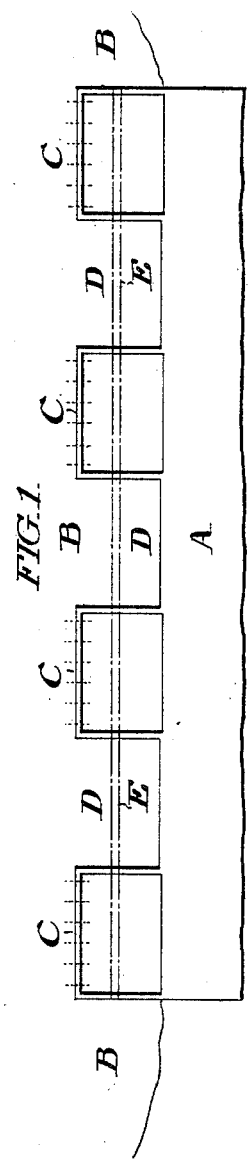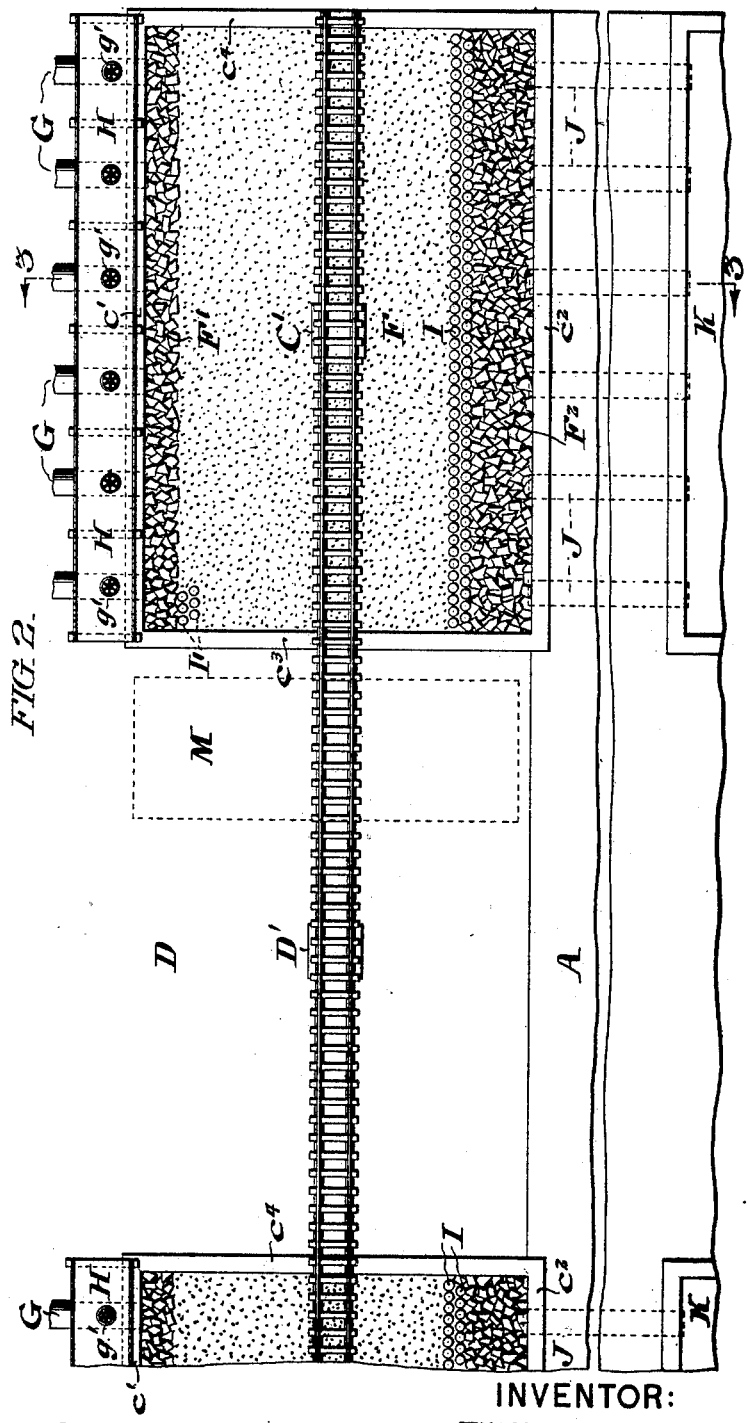

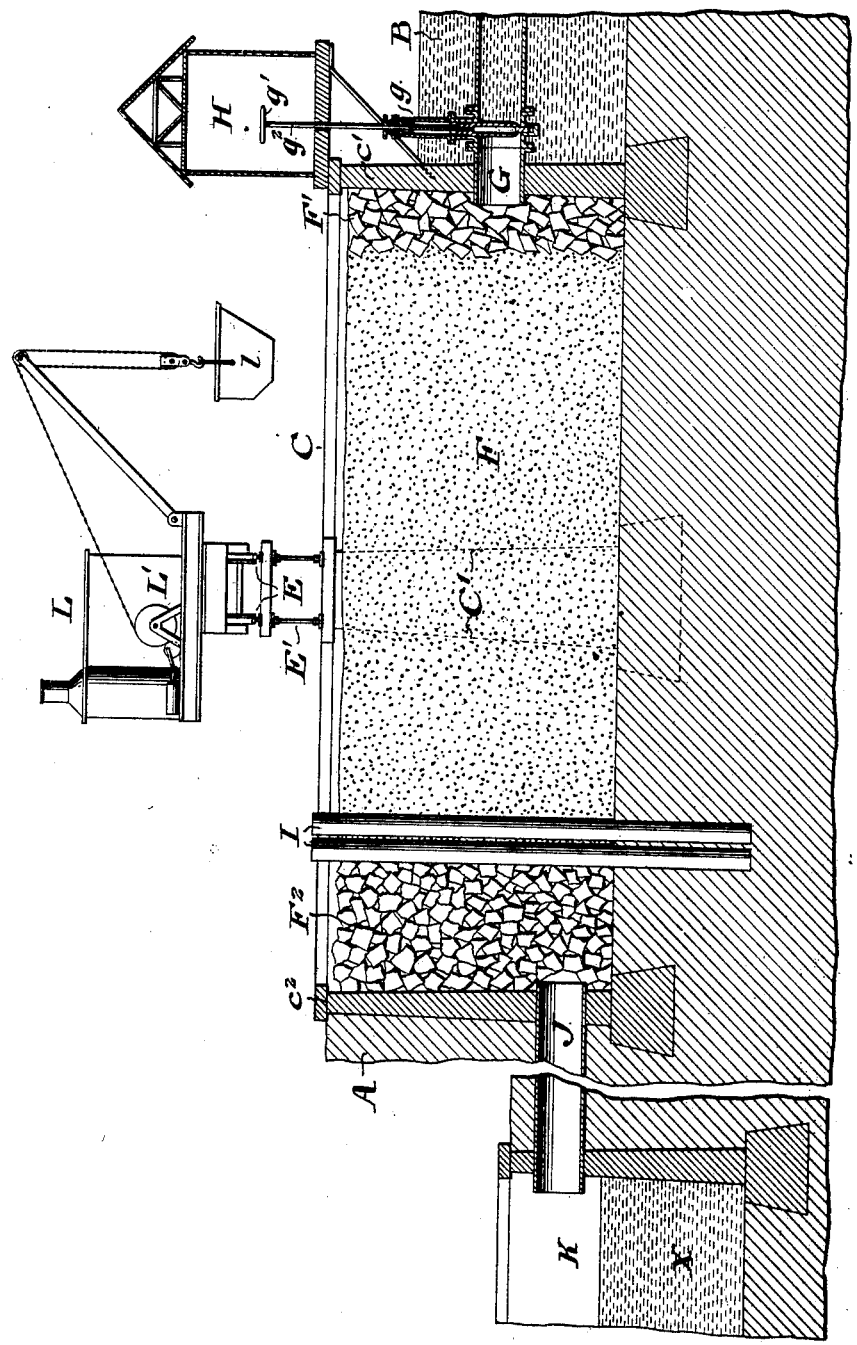

THOMAS E. McCANN, OF PHILADELPHIA, PENNSYLVANIA.

FILTER.

SPECIFICATION forming part of Letters Patent No. 679,536, dated July 30, 1901.

Application filed March 20, 1901. Serial No. 51,988. (No model.)

*To all whom it may concern:*

Be it known that I, THOMAS E. MCCANN, of Philadelphia, in the State of Pennsylvania, have invented certain new and useful Improvements in Filters, whereof the following is a specification, reference being had to the accompanying drawings.

My invention relates generally to granular-bed filters, and is particularly applicable to the purification of a municipal or other large supply of water.

My invention consists in the advantageous features of arrangement and construction hereinafter more definitely specified and claimed.

As hereinafter described, my invention comprehends the construction of a series of vertical-walled filter-bed inclosures arranged upon an embankment of a body of water to project in the latter in such relation as to afford dock-spaces between the adjoining inclosures, said inclosures and docks being bridged by a railway. The filter material comprising the beds within said inclosures may be conveniently transferred to and from vessels moored in said docks by means of a crane or similar device arranged to traverse said railway. Such an arrangement is advantageous in that any one of the filter-beds may be removed and renewed without interference with the remainder of the filters or beds and at a minimum cost for transportation.

In the accompanying drawings, Figure 1 is a diagrammatic plan view of a filter plant conveniently embodying my invention. Fig. 2 is a partial plan view showing details of the filter-beds indicated in Fig. 1. Fig. 3 is a vertical sectional view taken on the line 3 3 in Fig. 2.

Referring to Fig. 1, A is the embankment of a body of water B, and C represents piers adjutting into said body of water from said embankment. Said piers C are arranged in series in such relation as to form docks D between the adjoining piers, and E is a railway extending over the piers and docks of said series. Each of said piers C comprises an inclosure formed of the vertical walls $c'$ $c^2$ $c^3$ $c^4$, preferably constructed of masonry, and the railway E, extending over said inclosures, is conveniently laid upon the bridge structure E' and supported by the walls $c^3$ $c^4$, by the columns $C'$ in said inclosures, and by the columns $D'$ in said docks. In each of said inclosures C, beneath the railway E, is embedded a mass of fine granular filtering material F, such as sharp sand, which is separated from the inclosure-wall $c'$ by the vertical layer of granular material $F'$, coarser than said mass F. As shown in Fig. 3, said layer $F'$ is opposed to the inlets G and prevents the fine granular mass F from clogging said inlets and also serves to facilitate the distribution of the raw water to said mass. Each of said inlets G is provided with a valve $g$, arranged to be actuated by a hand-wheel $g'$, fixed upon its spindle $g^2$, extending through the floor of the valve-house H, which latter rests upon the wall $c'$. Said filtering material F is separated from the wall $c^2$ by the vertical layer of coarse material $F^2$, and between said mass F and said vertical layer $F^2$ is a wall of piles I. Said wall I serves to retain the layer $F^2$ in place, and the latter prevents the access of the granular mass F to the outlets J, through which the filtrate X is delivered to the receiving-basins K, which may be located in any convenient relation to the filter. The vertical layer $F'$ may be similarly supported by a wall of piles $I'$, as indicated in Fig. 2.

Referring to Fig. 3, L is a crane provided with the bucket $l$ and the winch $L'$, adapted to raise and lower said bucket. Said crane is arranged to traverse the railway E and is adapted to transfer the filtering material F to and from the piers C and the docks D.

It is well known that the output of filtrate per unit of area in filters of the class described rapidly decreases during the operation thereof, owing to the deposit of silt in the interstices between the grains of the filtering material, and that the efficiency of such filters can only be maintained by renewal of the beds at short intervals, therefore the cost of maintenance of such a filter being almost entirely dependent upon the facility with which the material comprising it can be renewed and replaced. The construction and arrangement hereinbefore described are of obvious advantage in that the material comprising the beds F may be conveyed in immediate adjacency to the piers C by vessels M, as indicated in Fig. 2, be raised from said vessels and deposited within the bed inclosures by means of the crane L, and be removed in like manner at a minimum cost for transportation.

I do not desire to limit myself to the precise construction and arrangement of the parts hereinbefore described, as it is obvious that various modifications may be made therein without departing from the essential features of my invention.

I claim—

1. In a filter, the combination with a pier adjutting into a body of water from an embankment thereof; of a mass of filtering material embedded in said pier; a dock adjoining said pier; a railway extending over the bed in said pier to said dock; and means arranged to traverse said railway and to transfer the filtering material to and from said pier-bed and said dock, substantially as set forth.

2. In a filter, the combination with a series of alternately-disposed piers and docks in an embankment of a body of water; of masses of filtering material respectively embedded in said piers; a railway extending over the piers and docks of said series; and means arranged to traverse said railway and to transfer the filtering material to and from said piers and docks, substantially as set forth.

3. In a filter, the combination with a pier adjutting into a body of water from an embankment thereof, and comprising a walled inclosure; of a mass of fine granular material embedded in said inclosure; a vertical layer of granular material, coarser than said mass, between said mass and the wall of said inclosure; and means arranged to control the flow of water horizontally through said mass, substantially as set forth.

4. In a filter, the combination with a pier adjutting into a body of water from an embankment thereof, and comprising a walled inclosure; of a mass of fine granular material embedded in said inclosure; a vertical layer of granular material, coarser than said mass, between said mass and the wall of said inclosure; a wall of piles between said mass and said layer of coarse granular material; and means arranged to control the flow of water horizontally through said mass and said wall of piles, substantially as set forth.

5. In a filter, the combination with a pier adjutting into a body of water from an embankment thereof and comprising a walled inclosure; of a mass of filtering material embedded in said inclosure; a column in said inclosure; a dock adjoining said pier; a railway supported by said inclosure and said column, extending over the bed of said pier to said dock; and means arranged to traverse said railway and to transfer the filtering material to and from said pier-bed and said dock, substantially as set forth.

In testimony whereof I have hereunto signed my name, at Philadelphia, Pennsylvania, this 18th day of March, 1901.

THOMAS E. McCANN.

Witnesses:
ARTHUR E. PAIGE,
E. L. FULLERTON.